Feb. 21, 1956  D. C. APPS  2,735,292
TIRE THUMP MEASURING APPARATUS
Filed Sept. 11, 1952
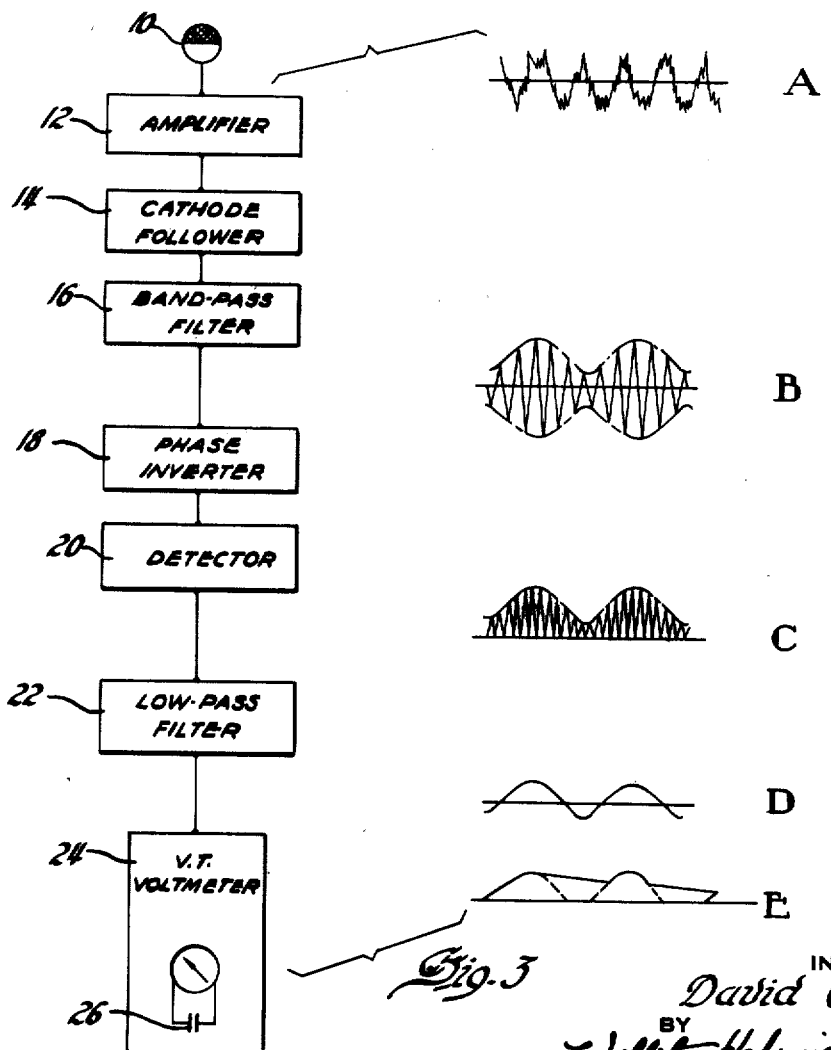
INVENTOR
David C. Apps
BY
Willits, Helwig & Baillie
ATTORNEYS United States Patent Office 2,735,292
Patented Feb. 21, 1956

2,735,292

TIRE THUMP MEASURING APPARATUS

David C. Apps, Brighton, Mich., assignor to General Motors Corporation, Detroit, Mich., a corporation of Delaware Application September 11, 1952, Serial No. 309,124

7 Claims. (Cl. 73—69)

This invention relates to electrical measuring apparatus and, more particularly, to an apparatus which measures quantitatively on an arbitrary scale a disturbance prevalent in modern motor cars known as "tire thump."

Tire thump is a descriptive term that has been adopted by the automotive and tire industry to describe an audible phenomenon which occurs over a portion of the operating speed range of a motor vehicle and which is most readily heard when travelling down a smooth Tarvia road as one thump for each wheel revolution, much as if a boot were present in one of the tires. It has been ascertained that the tires are the principal cause of the disturbance, although it is known that various cars exhibit a wide range of sensitivity to a given tire.

With the ultimate aim of eliminating this source of annoyance and improving the performance of tires and automotive vehicles from the standpoint of wear and riding comfort, for example, the desirability of having apparatus which will aid in the investigation of the nature and character of this phenomenon and which will rate a measured value of tire thump in terms of an arbitrary thump number has been expressed.

Accordingly, it is the general object of the present invention to provide suitable apparatus for the accomplishment of the above ends and, more specifically, to provide a simple, efficient and inexpensive apparatus which effectively separates tire thump vibrations from the extraneous vibrations produced by the vehicle and which affords a direct and reliable measure of tire thump that may be used to rate a tire in terms of a thump number.

Other objects, together with the features and advantages attending the present invention will appear more fully from the following detailed description and drawings, wherein:

Fig. 1 is a wave pattern that is useful in explaining the invention and illustrates the resulting beat interference pattern occuring between a pair of pure tones of slightly different frequency;

Fig. 2 is an oscillogram of tire thump sound;

Fig. 3 is a functional block diagrammatic drawing of a preferred embodiment of the invention; and Figs. 3A to 3E illustrate wave forms that are useful in explaining the invention.

Before proceeding with a discussion of the apparatus of the invention, it may aid in the understanding of the operation thereof to describe more fully the exact nature and character of tire thump based on investigations resulting in the present apparatus for measuring this phenomenon. The present invention is based on the finding that tire thump is a beat interference phenomenon that occurs in a speed range of approximately 15 to 50 miles per hour between two tones whose frequency difference is equal to the wheel speed. The tones are produced by higher order vibrations, which are excited generally by irregularities or discontinuities in the tire and occur at harmonics of the wheel speed. Interference between successive harmonic tones produces a first order difference vibration which is heard as one thump for each revolution of the wheel.

To illustrate a case where tire thump is heard in a car traveling at, say, 30 M. P. H., assume that the 7th and 8th harmonic tones of the wheel speed are strongly generated. A typical tire size is such that the wheel speed is approximately 6 revolutions per second at 30 M. P. H. so that these harmonic tones excite structural or acoustical resonances in the car at or near 42 and 48 cycles per second, respectively. By reason of the slightly different frequency of the generated tones, these two successive harmonic frequencies will beat or interfere so as to produce a resulting wave $b$ as illustrated by Fig. 1, the total intensity or envelope $a$ of which has a slow cyclical variation of 6 C. P. S. corresponding to the frequency difference between the said successive harmonic tones and is the same frequency as the rotational speed of the wheel. Although the human ear cannot detect pure tones of such low frequency as that represented by curve $a$, the ear is able to sense changes in the intensity of the audible wave $b$ resulting from the combining of the audible harmonic tones, and it is these slow periodic changes in the intensity of the resulting audible wave $b$ that constitute tire thump vibrations.

Sometimes three strong harmonics are generated and due to the cycling and phasing therebetween, the 7th and 8th harmonics may be the chief constituents of the thump at one instant of time, while a short time later the 8th and 9th harmonics may govern. At any rate, higher audible frequencies are excited, which form constituents of the resulting audible wave $b$. These higher audible frequencies act as "carriers" for the beat frequency disturbance and are the means by which an otherwise inaudible tone is rendered audible.

The wave form shown in Fig. 1 is intended to illustrate the beat interference pattern occurring between two pure frequency tones or vibrations of slightly different frequency but of equal amplitude as may be produced by a simple vibration producing agency. The wave pattern of actual tire thump vibrations will correspond more nearly to the showing of Fig. 2 in which the distance $s$ between successive maxima of the wave envelope is equal to one revolution of the wheel. The operation of the present invention depends on measuring the amplitude of the envelope of waves such as are illustrated in Figs. 1, 2 and 3B or the "depth of modulation" of the carrier produced by the interfering harmonic tones.

Turning now to Fig. 3, which is a functional block diagrammatic showing of a preferred embodiment of a measuring apparatus in accordance with the present invention, the invention comprises, in the relative order named, a transducer 10, an amplifier 12, a cathode follower 14, a band-pass filter 16, a phase inverter 18, a balanced detector 20, a low-pass filter 22 and suitable indicating or exhibiting means 24.

The transducer 10 may be a suitable vibration pick-up, preferably, a sound microphone pick-up of the crystal or condenser variety having a good low frequency response that is substantially flat over a frequency range of from about 20 to, say, 60 C. P. S. corresponding to the frequency range over which the aforementioned interfering higher order vibrations are excited. Such microphone pick-ups are generally available as, for example, the Altec-21b condenser microphone manufactured by the Altec Lansing Corporation of New York.

The amplifier 12 is an audio frequency amplifier that could be of the resistance-coupled variety designed in accordance with conventional methods and should have a flat low end response from at least twenty to, say, around sixty C. P. S. The amplifier may be connected to a conventional cathode follower stage 14 in order to present a proper impedance match to the succeeding band-pass filter 16, which is designed to pass frequencies from about 20 to at least 60 C. P. S. The filter 16 could be designed along the lines suggested on pages 230–231 of the "Radio Engineer's Handbook," by F. E. Terman, published in 1943 by McGraw, Hill & Company. Filters of this type are commercially available from various filter manufacturers, as Burnell & Company of Yonkers, New York.

The phase inverter 18 may assume any of several forms well known in the art and serves to convert from an unbalanced line to a balanced or double-ended line in its output, which may be transformer coupled to the balanced detector 20. The detector 20 may comprise a pair of diode rectifiers connected in conventional manner to provide full wave detection or rectification of modulated waves. The low-pass filter 22 could be connected as a load in the output of the detector 20 and may be designed in accordance with the low-pass sections illustrated on page 228 of the aforementioned "Radio Engineer's Handbook." This filter has an upper cut-off frequency of around 10 C. P. S. which corresponds to wheel speeds of around 50 M. P. H. above which tire thump loses its low speed characteristic as far as the ear is concerned and partakes of other forms.

The indicating or exhibiting instrument 24 may be an A. C. vacuum tube voltmeter altered to have a long time constant to eliminate meter hand flutter and to facilitate reading at the low frequencies involved. A Ballantine Laboratories model 302 vacuum tube voltmeter with a 400 micro-farad condenser 26 shown shunted across the meter movement thereof was found to present sufficient damping to obtain satisfactory readings of the average of the low frequency variations of the recovered thump signal appearing in the output of the final filter.

In operation of the above described apparatus for the measurement of tire thump, the vehicle is driven, preferably, down a smooth Tarvia road in order to reduce other disturbances to a minimum and the microphone pick-up 10 is placed in a position at or near the ear of the driver or passenger of the vehicle. The microphone serves to sense and convert the complex sound vibration pattern produced by the vehicle into electrical waves representative thereof indicated generally at Fig. 3A These electrical waves will include, in general, the tire thump signal carried by the principal higher order harmonic vibrations generated by the tires in addition to many extraneous vibrations produced by the vehicle. No attempt is made in the wave of Fig. 3A to accurately depict the composite form of the many components which may be present therein. After amplification in the amplifier 12, the electrical waves are applied to the band-pass filter 16 which serves to accept and to pass therethrough all signal components, both pure and complex, lying in a band of frequencies of from about 20 to at least 60 C. P. S. wide corresponding to the range of frequencies over which the aforementioned interfering higher order vibration components are excited and to reject the extraneous components mentioned above. Experience has indicated that tire thump is rarely conveyed by a carrier outside of this frequency range. The output of the band-pass filter may correspond to the wave form shown in Fig. 3B and more nearly to that shown in Fig. 2.

The band of accepted frequencies is then demodulated or rectified by the full wave detector 20 to produce a wave (Fig. 3C) having twice the the frequency of the carrier of Fig. 3B. After filtering out the carrier tone or tones with the low-pass filter 22, the original envelope or contour is recovered and applied to the indicating instrument 24 to obtain a measure of the amplitude thereof. In order to prevent the D. C. component of the detector output from influencing the measurements, the filter 22 could be designed to have a lower cut-off limit of around 2 C. P. S. which is below the tire thump frequency range, or a capacitor coupling, between the output of the filter and the input to the meter could be employed to eliminate the D. C. component of the detected wave. The output of the filter 22 will then contain the recovered tire thump signal as shown in Fig. 3D. The condenser 26, shunted across the meter movement of the VTVM24, functions to smooth out the low frequency variations of the detected tire thump signal as indicated by the solid line of the wave shown in Fig. 3E so as to facilitate reading the amplitude thereof.

It is to be noted that no pure or single frequency tones are passed through the system, thereby eliminating the possibility of false indications or measurements. All signals, except those lying in a frequency range from about 20 to, say, 60 C. P. S. are rejected by the first filter. Pure tones between 20 and 60 C. P. S. that pass through the first filter 16 are separated or rejected by the final filter 22 whose 10 C. P. S. upper cut-off limit is without the acceptance range of the first filter. Pure frequency tones of 10 C. P. S. or less will not pass the first filter. Thus all pure tones are rejected, as they should be, for they do not constitute tire thump. Only the difference frequency tones below 10 C. P. S. which form the envelope for their carrier of Fig. 3B, can activate the indicating meter. This difference frequency may include second order frequencies up to 5 wheel R. P. S. (about 25 M. P. H.) but will be limited to first order frequencies between 5 and 10 wheel R. P. S. Experience has shown that the possible inclusion of second order difference frequencies at speeds under 25 M. P. H. in no way detracts from the accuracy of the indications or usefulness of the device, presumably because second order difference frequencies are not of sufficient intensity or strength to be of importance at speeds below 25 M. P. H. The data thus obtained may be correlated with the ratings of experienced observers and be expressed in terms of a thump number.

The apparatus may be calibrated by inserting two electrical signals of known amplitude and having frequencies differing by, say, 5 C. P. S. and both lying between, say, 20 and 60 C. P. S. in the input of the band pass filter. These signals will interfere causing a resulting beat type of wave similar to that shown in Fig. 1.

The amplitude of the recovered envelope signal is measured on the VTVM24 and its value used as a basis for comparison of measured thump vibrations. Another method of calibration involves the insertion of a single tone between 20 and 60 C. P. S. which is read on the vacuum tube voltmeter 24 by by-passing the 10 C. P. S. low-pass filter.

It is to be understood that the above-described arrangement and application are but illustrative of the principles of the invention and that other arrangements and applications may be devised therefor by those skilled in the art which will embody the principles of the invention and fall within the spirit and scope thereof.

What is claimed is:

1. Apparatus for obtaining a measure of the intensity of tire thump vibrations resulting from the beating of successive higher order vibrations which are produced by the tires of a vehicle and are harmonically related to the rotational speed of the wheels thereof, said vibrations being included within a complex vibration pattern excited by the vehicle, said apparatus comprising, in combination, means for sensing and converting the vibrations produced by said vehicle into electrical waves representative thereof, means connected to said sensing means and separating from said electrical waves components thereof lying within a frequency band corresponding to the range over which said higher order vibrations are excited and produce said tire thump vibrations, means connected to said separating means for deriving from said wave components lying within said frequency band said tire thump vibrations corresponding to variations in the total intensity of said beating successive higher order vibrations, and means for indicating the intensity of said separated tire thump vibrations.

2. Apparatus for obtaining a measure of the intensity of tire thump vibrations resulting from the beating of successive higher order vibrations which are produced by the tires of a vehicle and are harmonically related to the rotational speed of the wheels thereof, said apparatus comprising, in combination, transducer means for sensing and converting the vibrations produced by said vehicle into electrical waves representative thereof, amplifying means connected to said transducer means, first filter means connected to said amplifying means for separating from said electrical waves components thereof lying within a frequency band corresponding to the range over which said higher order vibrations are excited and produce said tire thump vibrations, detector means connected to said first filter means for detecting said tire thump vibrations occurring between said beating higher order vibrations, second filter means connected to said detector means effective to pass frequencies in the range over which tire thump vibrations are encountered, and indicating means connected to said second filter means.

3. Apparatus for obtaining a measure of the intensity of tire thump vibrations resulting from the beating of successive higher order vibrations which are produced by the tires of a vehicle and are harmonically related to the rotational speed thereof, said apparatus comprising, in combination, vibration pick-up means for sensing and converting the vibrations produced by said vehicle into electrical waves representative thereof, amplifying means connected to said vibration pick-up means, band-pass filter means connected to said amplifying means, said filter means having a pass-band lying within a frequency band corresponding to the range over which said higher order vibrations are excited and produce said tire thump variations, detector means connected to said band-pass filter means, low-pass filter means connected to said detector means and having an upper cut-off limit lying without the acceptance range of said band-pass filter means, and indicating means connected to said low-pass filter means.

4. Tire thump measuring apparatus comprising, in combination, microphonic sound pick-up means, amplifying means connected to said pick-up means, band-pass filter means connected to said amplifying means and having a pass band lying in a frequency range of from about 20 to 60 cycles per second, detector means connected to said band-pass filter means, low-pass filter means connected to said detector means and having an upper cut-off limit of around 10 cycles per second, and indicating means connected to said low pass filter means.

5. Apparatus for measuring tire thump vibrations which are carried by higher order interfering vibrations that are harmonically related to the rotational speed of the wheels of a vehicle, said apparatus comprising, in combination, vibration pickup means, first filter means connected to said pickup means and effective to pass vibrations lying within a frequency range over which said higher order interfering vibrations are excited and to reject other vibrations lying without said frequency range therefrom, detector means connected to said filter means and detecting said tire thump vibrations carried by said higher order vibrations, second filter means effective to pass vibrations of tire thump frequency and to reject vibrations of such frequency as are passed by said first filter means, and indicating means connected to said low pass filter means.

6. Apparatus for obtaining a measure of the intensity of a particular order of difference vibrations occurring between combining higher order vibrations which are harmonically related to the rotational speed of the wheels of a vehicle and are excited together with other vibrations by said vehicle, said apparatus comprising, in combination means sensing and converting the vibrations produced by said vehicle into electrical waves representative thereof, means connected to said sensing means and separating from said sensed vibrations such components thereof as lie within a frequency band over which said higher order vibrations are excited, means connected to said separating means for deriving from said separated wave components said particular order of difference vibrations corresponding to variations in the amplitude of the total intensity of the wave resulting from said combining higher order vibrations, and means connected to said last named means for indicating the intensity of said particular order of difference vibrations.

7. Apparatus for obtaining a measure of the intensity of the first order difference vibrations resulting from interfering successive higher order vibrations which are harmonically related to the rotational speed of the wheels of a vehicle and are excited together with other vibrations by said vehicle, said apparatus comprising, in combination, means sensing and converting the vibrations produced by said vehicle into electrical waves, means connected to said sensing means for separating from said vibration waves sensed thereby such vibration wave components as lie within the frequency band over which said successive high order wheel rotational vibrations are excited, means connected to said separating means for deriving from said separated wave components said first order difference vibrations corresponding to the variations in the amplitude of the total intensity of the wave resulting from the interference of said successive higher order vibration components, and means connected to said last named means for indicating the intensity of said first order difference vibrations.

References Cited in the file of this patent

UNITED STATES PATENTS

| | | |
|---|---|---|
| 1,814,898 | Deardorff | July 14, 1931 |
| 2,009,997 | Germond | Aug. 6, 1935 |
| 2,340,714 | Traver et al. | Feb. 1, 1944 |
| 2,377,349 | MacKenzie | June 5, 1945 |
| 2,417,974 | Downs et al. | Mar. 25, 1947 |

Notice of Adverse Decision in Interference

In Interference No. 88,283 involving Patent No. 2,735,292, D. C. Apps, Tire thump measuring apparatus, final judgment adverse to the patentee was rendered July 18, 1957, as to claims 4 and 5.

[*Official Gazette August 27, 1957.*]